(12) United States Patent
Tseng et al.

(10) Patent No.: US 6,471,610 B1
(45) Date of Patent: Oct. 29, 2002

(54) FRONT DERAILLEUR FOR A BICYCLE

(76) Inventors: Ching-Huan Tseng, 2F, No. 5, Lane 1007, Ta Hsueh Rd., E. Dist., Hsinchu (TW); Yu-Jen Chien, No. 30, Wen Chang Rd., Yi Lan City (TW)

( * ) Notice: Subject to any disclaimer, the term of this patent is extended or adjusted under 35 U.S.C. 154(b) by 37 days.

(21) Appl. No.: 09/589,208

(22) Filed: Jun. 7, 2000

(51) Int. Cl.[7] ................................................ F16H 9/00
(52) U.S. Cl. ...................................................... 474/80
(58) Field of Search ........................... 474/80, 82, 153, 474/174, 175, 176

(56) References Cited

U.S. PATENT DOCUMENTS

| | | | | |
|---|---|---|---|---|
| 4,452,593 A | * | 6/1984 | Coue ............................ | 474/80 |
| 5,649,877 A | * | 7/1997 | Patterson ..................... | 474/80 |
| 5,857,932 A | * | 1/1999 | Sugimoto ..................... | 474/82 |

* cited by examiner

*Primary Examiner*—David A. Bucci
*Assistant Examiner*—Vicky A. Johnson
(74) *Attorney, Agent, or Firm*—Powell, Goldstein, Frazer & Murphy LLP

(57) ABSTRACT

The present invention discloses a front derailleur for a bicycle to shift a chain via a chain guide between at least two sprockets which are attached on a frame of the bicycle. The front derailleur includes a wire extending through a stopper which is attached on the frame of the bicycle for transmitting a tension. An actuating link is connected to the wire in response to the tension for driving the chain guide to shift the chain between the sprockets. A wire guide is mounted on a seat tube of the frame and connected with the wire between the stopper and the actuating link for straightening the wire substantially parallel to the seat tube, thereby reducing a friction between the wire and the stopper.

8 Claims, 5 Drawing Sheets

FRONT DERAILLEUR FOR A BICYCLE

FIELD OF THE INVENTION

The present invention relates to a front derailleur for a bicycle, and more specifically to a front derailleur with a wire guide for changing the direction of a wire, which is employed to drive an actuating mechanism of a bicycle, therefore, reducing the friction between the wire and stopper, as well as allowing to elongate the stroke of wire.

BACKGROUND OF THE INVENTION

A bicycle is commonly used as a transportation vehicle and widely employed as a sport machine. Basically, the bicycle includes several parts, such as transmission system, brake system, frame, and so on, although these parts vary from different types of bicycles. The frame constructs the main body of a bicycle and allows other systems, such as derailleur system, transmission system and brake, to be attached thereon. The transmission system, a mechanism in combination of chain, chainwheel, freewheel, pedal, and so on, plays a role to transmit a force generated from cyclist to drive the bicycle. In the derailleur system, which includes a chain, front derailleur, rear derailleur, wire, and shift lever, the chain can be shift among sprockets of the chainwheel and freewheel by the front derailleur and rear derailleur in response to forces generated by cyclist or return spring of derailleur system. Since the sprockets of the chainwheel and freewheel have different teeth, the cyclist may adjust the chain through the front derailleur and rear derailleur to obtain a gear ratio between the sprockets of the chainwheel and freewheel, so as to ride the bicycle in a time-saving or labor-saving mode. Therefore, the derailleur system is a vital factor for the performance of bicycle.

Referring to FIG. 1, a front view of front derailleur is shown. The front derailleur includes a link 37, actuating arm 36, wire 32, and chain guide 38. The chain guide 38 is connected with the link 37 and actuating arm 36, which are fixed on a seat tube 34 by a clamp 35. The link 37 and actuating arm 36 constitute a simple four-bar linkage mechanism, in which the actuating arm 36 is driven by a tension transmitting through the wire 32. When the cyclist push a shift lever (not shown in this figure), a tension transmitting through the wire 32 would drive the actuating arm 36 to push the chain guide 38 outwardly among the chainweel sprockets 42, 44 and 46, therefore, shifting the chain 40 thereon. However, because the wire 32 could only transmit a tension, the front derailleur must implant a return spring 39 to provide a return force for pulling the chain guide 38 inwardly, while the tension released.

Accordingly, the return spring 39 has to provide an strong enough return force to push the chain guide 38 inwardly back in order to overcome a great amount of tension of the chain 40 while the cyclist ride the bicycle uphill. If the return spring 39 can not effectively push the chain 40 inwardly after the tension of the wire 32 is released, it would be dangerous for the cyclist while riding a bicycle uphill. Nonetheless, the grater return force of return spring 39 brings the heavier load the cyclist needs to turn the shift lever for shifting the chain guide 38. Besides that, the friction between the wire 32 and stopper 30, through which the wire extending out of a flexible tube 31 that is employed to coat the wire, also contributes an extra amount to the load the cyclist needs to turn the shift lever. Therefore, how to reduce the load for pushing the shift lever as well as providing a strong enough return force of return spring turns to be an important issue for upgrading the performance of bicycle.

In addition, as for some specifications of conventional shift levers, the stroke of the wire 32 is strictly limited in a specific range. For compatible to some conventional shift levers, the stopper 30 needs to be modified along the seat tube in order to obtain a longer stroke of wire. The closer distance from the stopper 30 to the actuating arm 36, the longer stroke of the wire 32. Thus, the stopper 30 is suggested to be positioned as close as to the actuating arm 36 for fitting some conventional shift levers. However, changing the position of stopper 30 would affect the effective force lever of pulling the actuating arm 36, increase the friction between the wire and stopper, and degrade the compatibility of front derailleur for conventional shift levers, therefore, preventing the front derailleur from being operated in an efficient way. In brief then, the position of stopper 30 is rigid according to conventional designs, thereby limiting the cooperation between some shift levers and front derailleurs.

SUMMARY OF THE INVENTION

An object of this invention is to provide a wire guide for straightening a wire thereby reducing the friction between the wire and stopper, which is at the end of a flexible tube for coating the wire.

Another object of this invention is to modify the stroke of wire for making sure that the front derailleur would be operated in an effective range, and suited for some conventional shift levers.

This invention discloses a novel front derailleur with a wire guide to straighten the wire relative to a stopper, which is at the end of a flexible tube for coating the wire. Since the angle between the wire and the stopper has been straightened, the friction between them would be further decreased. Therefore, the performance of bicycle is improved, due to the reduction of friction within the front derailleur system.

In addition, the position of wire guide, or stopper according to conventional designs, would affect the efficiency of front derailleur and the stroke of the wire, which contributes to the compatibility for some conventional shift levers. Since the present wire guide can be placed closer to the actuating arm than the conventional stopper does, the present front derailleur is capable to provide a longer stroke for fitting various conventional shift levers.

DETAILED DESCRIPTION OF THE PREFERRED EMBODIMENTS

This invention adopts a wire guide to straighten the wire, thereby reducing the friction between the wire and stopper due to their sharp angle. Furthermore, as a result of adopting the wire guide, its position could be freely modified along the seat tube, so as to provide a adjustable stroke of wire, thus fitting various conventional shift levers. For illustrating this invention, the schemes for reducing the friction between the stopper and wire and elongating the stoke of wire are first illustrated, and then two embodiments of this invention are set forth in details as follows.

Figure 1:
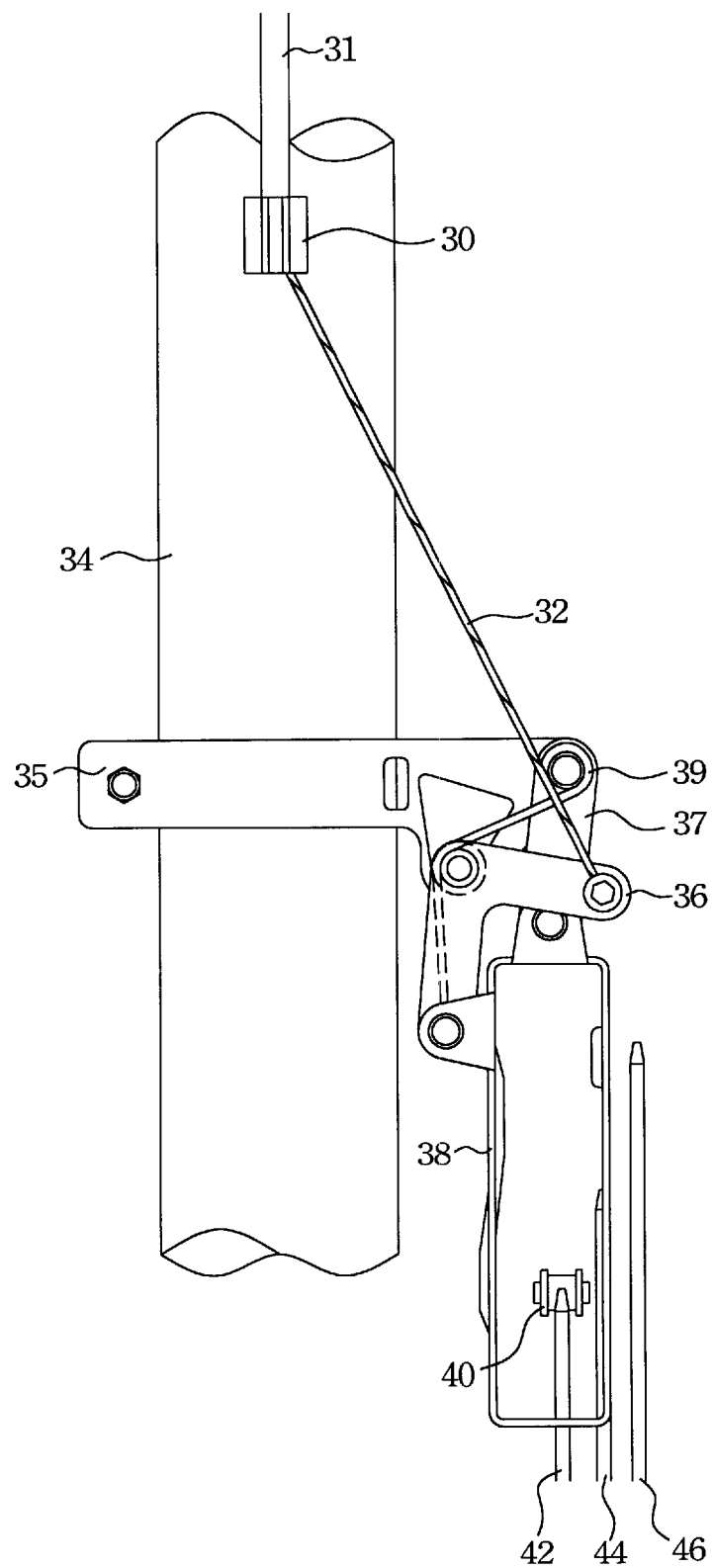
FIG. 1 is a front view of a conventional front derailleur.
Figure 2:
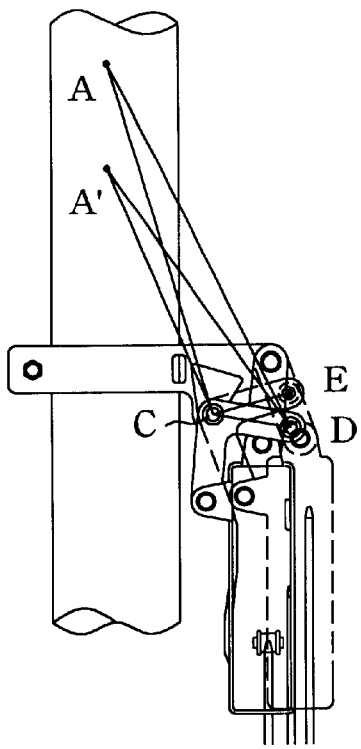
FIG. 2 shows the schemes for driving an actuating arm in two different positions of stopper.
Figure 3:
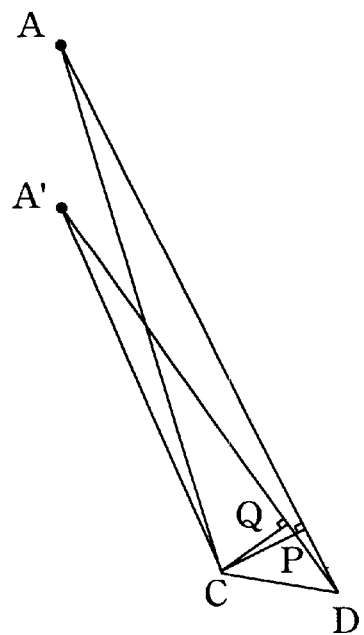
FIG. 3 is an analytic diagram for illustrating the schemes for driving an actuating arm in two different positions of stopper.

Referring to FIG. 2 and FIG. 3, dots A and A' represent two different positions of stopper. Because of the different positions of stopper, it induces different amount of the moment at pivot point C when the wire tension is the same at the initial state. As shown in FIG. 3, in the same initial tension, the wire with the stopper A would provide a greater moment to the actuating arm than that of the wire with the stopper A', since the force lever P is longer than force lever Q. In view of momentum, the wire with a higher stopper is superior to that with a lower stopper, in accordance with conventional designs.

Figure 4:
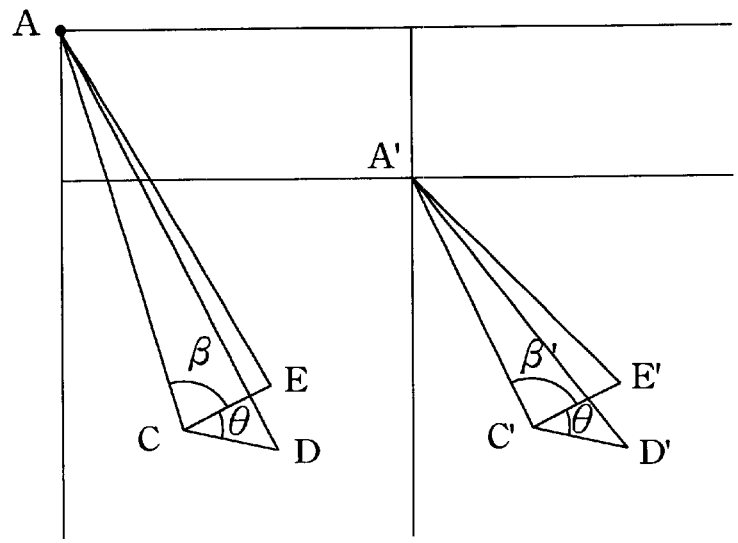
FIG. 4 is an analytic diagram for illustrating the strokes of wires in two different positions of stopper.

Turning to FIG. 2 and FIG. 4, the dot D and E respectively represent the initial and final position of an end of actuating arm. As shown in FIG. 4, the square deviation of initial and final length of the wire with stopper A can be introduced as following formulas.

$$\overline{AD}^2 = \overline{AC}^2 + \overline{CD}^2 - 2\overline{ACCD} \cos(\theta + \beta)$$

$$\overline{AE}^2 = \overline{AC}^2 + \overline{CE}^2 - 2\overline{ACCE} \cos \beta$$

$$\overline{CD} = \overline{CE}$$

$$\overline{AD}^2 - \overline{AE}^2 = -2\overline{ACCD}(\cos(\theta + \beta) - \cos \beta)$$

In the same manner, the square deviation of the initial and final length of the wire with stopper A' can be introduced as following formula.

$$\overline{A'D'}^2 - \overline{A'E'}^2 = -2\overline{A'C'C'D'}(\cos)(\theta + \beta') - \cos \beta'$$

Since the square deviation of AD and AE differs from that of A'D' and A'E', it can be understood that the strokes of wire with stopper A and A' are different. Therefore, changing the position of stopper would modify the stroke of wire.

Figure 5:
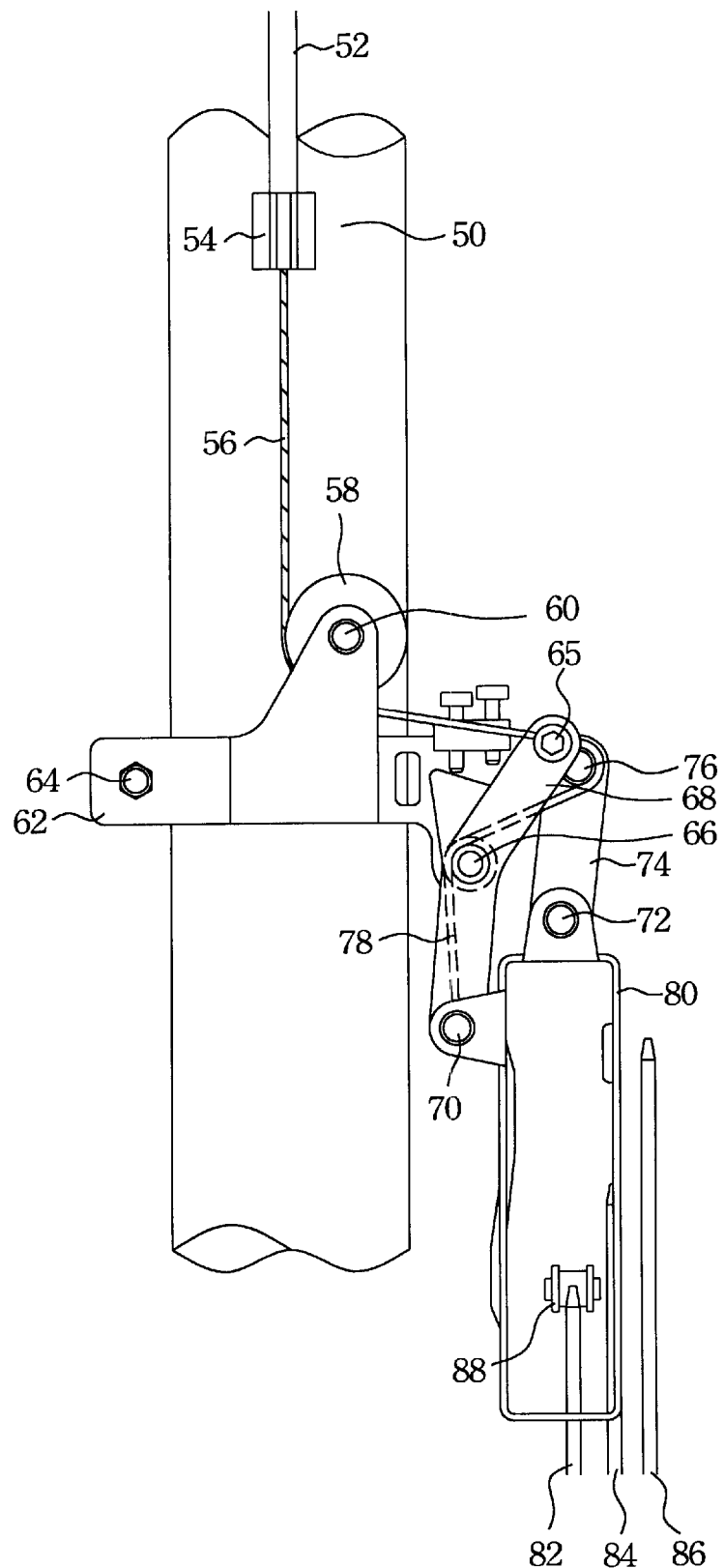
FIG. 5 is a front view of a front derailleur according to the first embodiment of this invention.

Referring to FIG. 5, it shows a front view of a front derailleur according to the first embodiment of this invention. The front derailleur includes a clamp 62, wire guide 58, actuating arm 68, link 74, and chain guide 80. The link 74 is connected to the clamp 62, which is fixed on a seat tube 50, a part of bicycle frame, through a screw 64, by a pivot pin 76. The actuating arm 68 is similarly connected to the clamp 62 by a pivot pin 66. The chain guide 80 is connected with the link 74 and actuating arm 68 by the pivot pins 72 and 70. The link 74 and actuating arm 68 constitute a simple four-bar linkage mechanism thereby allowing the chain guide 80 pivoting around the pivot pins 72 and 70 to outwardly shift the chain 88 among the sprockets 82, 84, and 86. It is noted that the actuating arm 68 could also be a cam, rotating mechanism, or linkage mechanism as various alternatives.

The wire guide 58 is mounted on the clamp 62 through a pivot pin 60 for straightening the wire 56. The wire 56 extending through a flexible tube 52, which ends at a stopper 54, is connected to the actuating arm 68 through the wire guide 58. When the actuating arm 68 is driven by a tension transmitting from the wire 56, the chain guide 80 would move outwardly so as to shift the chain 88 among sprockets 82, 84, and 86. Since the angle between the wire 56 and the stopper 54 has been straightened due to the wire guide 58, the friction between them is thereby reduced.

Moreover, the shape of actuating arm 66 can be slightly modified in order to suit the wire guide 58 for ensuring the force lever the wire 56 applies to the actuating arm 68 could be maintain in an efficient range. Additionally, since the wire guide 58 can be placed closes to the actuating arm 68 than the conventional stopper does, the present front derailleur is capable to provide a longer stroke for fitting some conventional shift levers. However, other alternatives, such as a slider, could also be employed to achieve the same function, as shown in FIG. 8. In addition, the wire guide 58 can be mounted on a base separating from the clamp 62 for advanced design flexibility, as shown in FIG. 9.

Finally, because the wire 56 could only transmit a tension to the actuating arm 68, a return spring 78 is needed to push the chain guide 80 inwardly back while the tension is released. In this preferred embodiment, the return spring is a torsion spring circled around the pivot pins 76, 66, and 70. However, other alternatives, such as tension spring, reed, and cable, could also be employed to achieve the same function.

Figure 6:
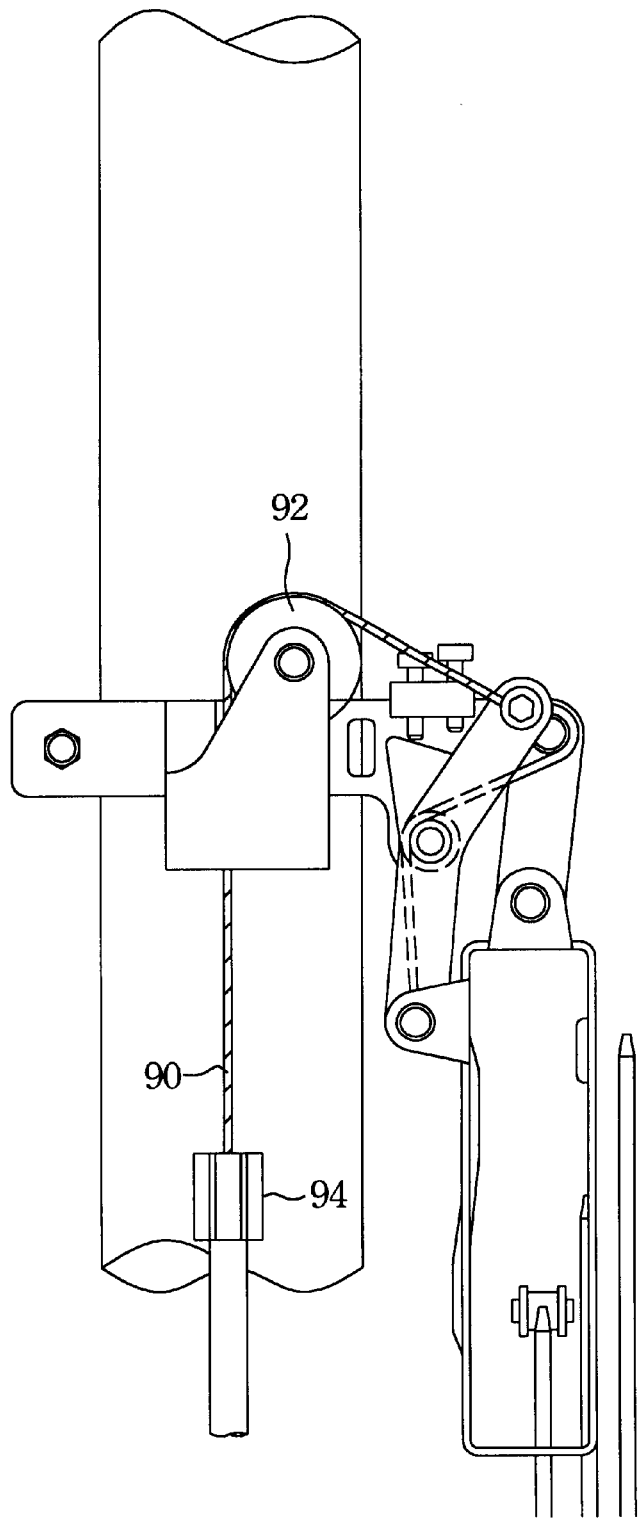
FIG. 6 is a front view of a front derailleur according to the second embodiment of this invention.

FIG. 6 shows the second embodiment according to this invention. Similarly, the front derailleur of the second embodiment proposes a wire guide 92 for straightening the wire 90. The primarily difference between the second and first embodiments is that the first one adopts an up-pulling design, as shown in FIG. 5, in which the stopper 54 is positioned higher than the wire guide 58, and the second one employs a down-pulling design, as shown in FIG. 6, in which the stopper 94 is positioned lower than the wire guide 92, therefore, expanding the application of this invention.

Figure 7:
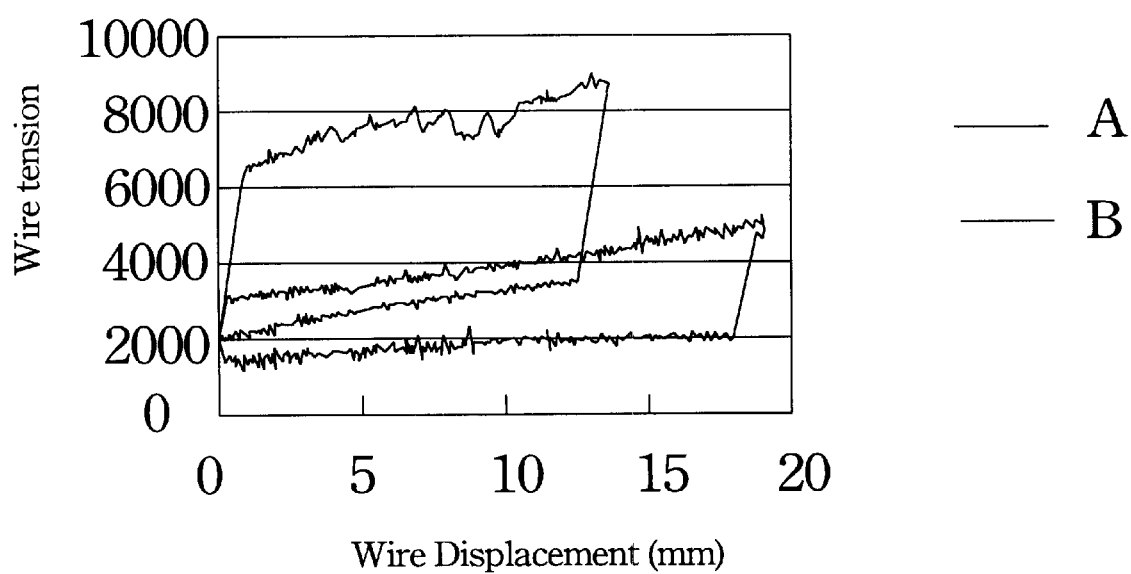
FIG. 7 shows a comparison of strokes of wire between the conventional front derailleur and the present front derailleur.

FIG. 7 shows an experimental result for comparing a conventional front derailleur and this presented front derailleur. The line A represents a result of the conventional one, in which the wire tension is as high as 9 kgw, and the stroke is approximate 12 mm. As for this invention, the line B demonstrates a highest wire tension is about 5 kgw, and the stroke is about 18 mm. According to this drawing, the present front derailleur efficiently reduce the tension the cyclist needs to overcome to drive the chain guide, and provides a longer stroke for suiting the requirements of various shift levers, such step positioned shift lever. Thus, it is easily understood that the present front derailleur could effectively improve the performance of bicycle.

As is understood by a person skilled in the art, the foregoing preferred embodiments of the present invention that are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A front derailleur for a bicycle to shift a chain via a chain guide between at least two sprockets which are attached on a frame of the bicycle, the front derailleur comprising:

a wire extending through a stopper which is attached on the frame of the bicycle for transmitting a tension;

an actuating link connected to the wire in response to the tension for driving the chain guide to shift the chain between the sprockets; and a wire guide mounted on a seat tube of the frame and connected with the wire between the stopper and the actuating link for straightening the wire substantially parallel to the seat tube, the stopper being lower than the wire guide for employing a design of down-pulling the wire to drive the actuating link, thereby reducing a friction between the wire and the stopper.

2. The front derailleur of claim 1, wherein the wire guide is a pulley mounted on the seat tube between the stopper and the actuating link, the pulley allowing the wire to round across to the actuating link, thereby reducing the fiction by straightening the wire.

3. The front derailleur of claim 1, wherein the stopper is higher than the wire guide for employing a design of up-pulling the wire to drive the actuating link.

4. The front derailleur of claim 1, wherein a position of the stopper is adjustable along the seat tube, therefore, being able to modify a displacement of the wire in response to the tension.

5. The front derailleur of claim 1, wherein the actuating link is constituted from an element selected from a group consisting of arm, cam, rotating mechanism, and linkage mechanism.

6. The front derailleur of claim 1, further comprising:

a clamp fixed on the seat tube by fastening a first end of the clamp;

a link connected between the chain guide and a second end of the clamp allowing the chain guide to pivot on the second end of clamp in response to the tension transmitting to the chain guide through the wire and the actuating link; and a spring positioned between the clamp and the chain guide for providing a return force to drive the chain guide swinging back after a release of the tension.

7. The front derailleur of claim 6, wherein the spring is selected from a group consisting of tension spring, torsion spring, and reed.

8. The front derailleur of claim 6, wherein the wire guide is mounted on a base, which is separated from the clamp and fixed on the seat tube.

* * * * *